United States Patent
Cheng et al.

(10) Patent No.: US 12,166,724 B2
(45) Date of Patent: Dec. 10, 2024

(54) METHOD OF CHANNEL STATE INFORMATION REPORTING AND RELATED DEVICE

(71) Applicant: SHARP KABUSHIKI KAISHA, Sakai (JP)

(72) Inventors: Yu-Hsin Cheng, Taipei (TW); Mei-Ju Shih, Taipei (TW); Hung-Chen Chen, Taipei (TW); Yung-Lan Tseng, Taipei (TW); Chia-Hao Yu, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 225 days.

(21) Appl. No.: 17/640,146

(22) PCT Filed: Sep. 10, 2020

(86) PCT No.: PCT/CN2020/114526
§ 371 (c)(1),
(2) Date: Mar. 3, 2022

(87) PCT Pub. No.: WO2021/057494
PCT Pub. Date: Apr. 1, 2021

(65) Prior Publication Data
US 2022/0311587 A1 Sep. 29, 2022

Related U.S. Application Data

(60) Provisional application No. 62/907,506, filed on Sep. 27, 2019.

(51) Int. Cl.
*H04L 5/00* (2006.01)
*H04B 7/06* (2006.01)
(Continued)

(52) U.S. Cl.
CPC ......... *H04L 5/0057* (2013.01); *H04B 7/0626* (2013.01); *H04L 5/0091* (2013.01); *H04W 72/569* (2023.01)

(58) Field of Classification Search
None
See application file for complete search history.

(56) References Cited

U.S. PATENT DOCUMENTS

2021/0153065 A1* 5/2021 Adjakple ............... H04W 76/14
2022/0182866 A1* 6/2022 Lee ........................ H04L 5/0048

FOREIGN PATENT DOCUMENTS

| WO | 2018082571 | 5/2018 |
| WO | 2018141952 | 8/2018 |
| WO | 2019096266 | 5/2019 |

OTHER PUBLICATIONS

Ericsson, PHY layer procedures for sidelink, 3GPP TSG-RAN WG1 Meeting #97, Reno, US, May 13-17, 2019, R1-1907143.
(Continued)

*Primary Examiner* — Hong Shao
(74) *Attorney, Agent, or Firm* — ScienBiziP, P.C.

(57) ABSTRACT

A method of channel state information (CSI) reporting by a first user equipment (UE) is disclosed. The method comprises receiving, from a base station (BS), a radio resource control (RRC) message to configure a first priority level for a logical channel; performing a sidelink (SL) communication with a second UE; generating a Medium Access Control (MAC) control element (CE) for a CSI report for the SL communication with a second priority level in a fixed value; determining a prioritization between the MAC CE including the CSI report and data from the logical channel according to the fixed value of the second priority level and the first priority level; and transmitting, to the second UE or the BS,
(Continued)

at least one of the MAC CE and the data from the logical channel based on the determined prioritization.

18 Claims, 5 Drawing Sheets

(51) Int. Cl.
*H04W 72/12* (2023.01)
*H04W 72/566* (2023.01)

(56) References Cited

OTHER PUBLICATIONS

Asia Pacific Telecom, Discussion on sidelink resource allocation mode 2, 3GPP TSG-RAN WG1 Meeting #97, Reno, USA, May 13-17, 2019, R1-1907361.
Samsung, Coexistence of PC5-based V2V operation and legacy Uu operation, 3GPP TSG RAN WG1 #86bis, Lisbon, Portugal Oct. 10-14, 2016, R1-1608993.

\* cited by examiner

METHOD OF CHANNEL STATE INFORMATION REPORTING AND RELATED DEVICE

CROSS-REFERENCE TO RELATED APPLICATION(S)

This application is the National Stage of International Patent Application No. PCT/CN2020/114526, filed on Sep. 10, 2020, entitled "METHOD OF CHANNEL STATE INFORMATION REPORTING AND RELATED DEVICE," which claims the benefit of and priority to U.S. Provisional Patent Application Ser. No. 62/907,506, filed on Sep. 27, 2019, entitled "Mechanism for report and feedback on SL," the contents of all of which are hereby incorporated fully by reference into the present disclosure.

FIELD

The present disclosure generally relates to wireless communications, and more particularly, to a method of channel state information reporting and a related device.

BACKGROUND

In new radio (NR) sidelink (SL) communications, a receiver (RX) user equipment (UE) may transmit a channel state information (CSI) report (e.g., including at least a Channel Quality Indicator (CQI), a Rank Indicator (RI), and/or a Layer 1 Reference Signal Received Power (L1-RSRP)) to a transmitter (TX) UE. Since a payload of a CSI report is generated by the layer L1 (e.g., the physical layer), there may be no priority information associated with a Physical Sidelink Shared Channel (PSSCH) containing the CSI report. Priority information may be used for determining TX parameters, such as TX power, modulation and coding scheme, and/or resource allocation. However, there is no specification addressing priority determination for a CSI report on either the Media Access Control (MAC) Control Element (CE) or the physical layer.

SUMMARY

The present disclosure provides a method of CSI reporting and a related device.

According to an aspect of the present disclosure, a method of channel state information (CSI) reporting by a first user equipment (UE) is provided. The method includes receiving, from a base station (BS), a radio resource control (RRC) message to configure a first priority level for a logical channel; performing a sidelink (SL) communication with a second UE; generating a Medium Access Control (MAC) control element (CE) for a CSI report for the SL communication with a second priority level in a fixed value; determining a prioritization between the MAC CE including the CSI report and data from the logical channel according to the fixed value of the second priority level and the first priority value; and transmitting, to the second UE or the BS, at least one of the MAC CE and the data from the logical channel based on the determined prioritization.

According to another aspect of the present disclosure, a first UE for CSI reporting is provided. The first UE comprises a processor, for executing computer-executable instructions; and a non-transitory machine-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DESCRIPTION

Figure 1:
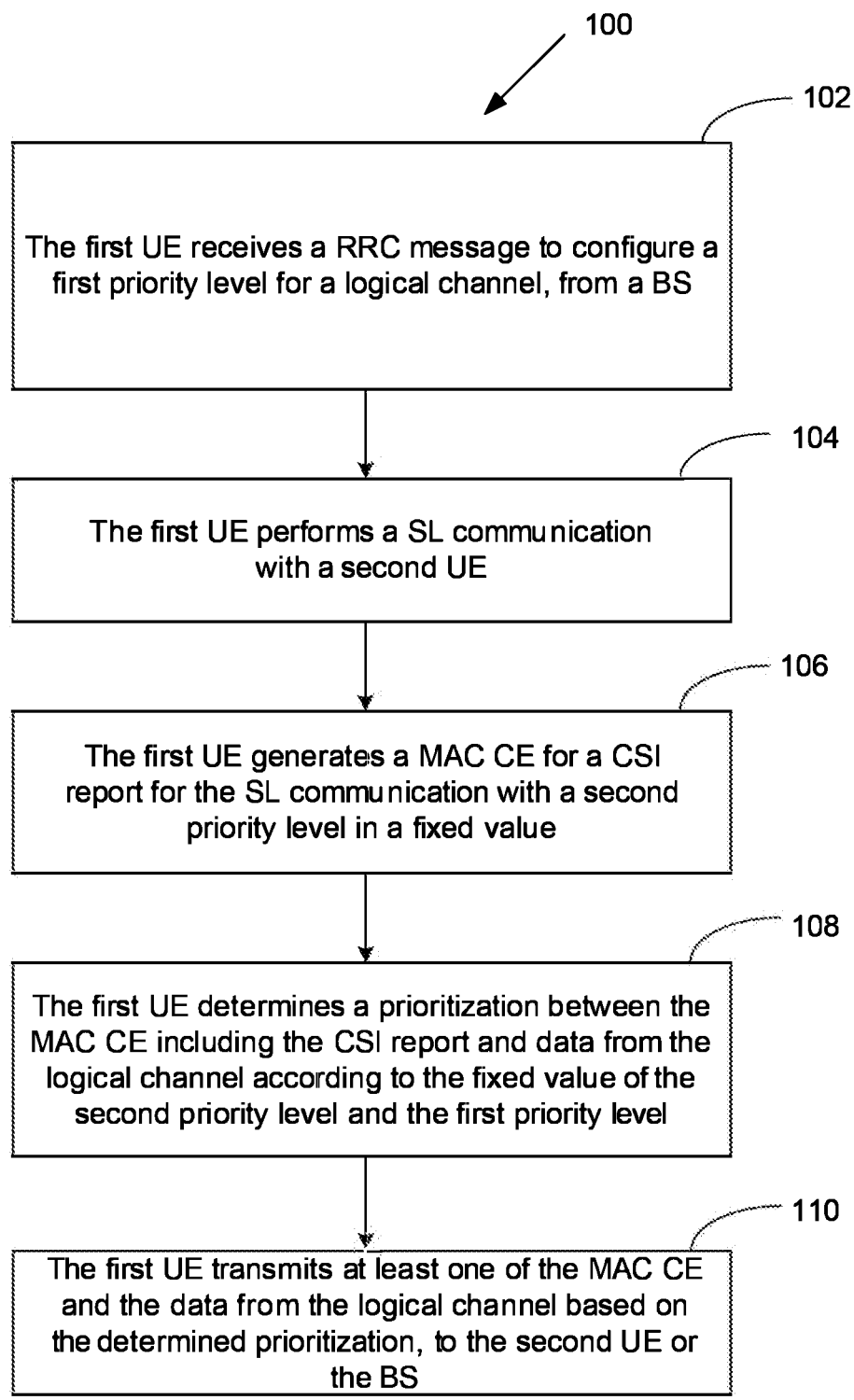
FIG. 1 is a flowchart illustrating a channel state information (CSI) reporting, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation" and "in some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "in one embodiment", "in one implementation", "in one alternative", etc., in the following disclosure refers to just one possible example that would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of application-specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-A Pro system, or a New Radio (NR) system) typically includes at least one base station (BS), at least one UE, and one or more optional network elements that provide connection with a network. The UE communicates with the network (e.g., a core network (CN), an Evolved Packet Core (EPC) network, an Evolved Universal Terrestrial Radio Access Network (RAN) (E-UTRAN), a Next-Generation (NG) Core (NGC) network, a Fifth Generation (5G) CN (5GC), or an internet via a RAN established by the BS.

It should be noted that, in the present disclosure, a UE may include, but is not limited to, a mobile station, a mobile terminal or device, or a user communication radio terminal. For example, a UE may be a portable radio equipment that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the Universal Mobile Telecommunications System (UMTS), an evolved node B (eNodeB, or eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), a Next Generation (NG)-eNB as in an Evolved Universal Terrestrial Radio Access (E-UTRA) BS in connection with the 5GC, a gNodeB (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage (e.g., each cell schedules the downlink (DL) and optionally uplink (UL) resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR Vehicle-to-Everything (V2X) services. Each cell may have overlapped coverage areas with other cells.

FIG. 1 illustrates a method 100 for a first UE to report channel state information (CSI). In action 102, the first UE receives a radio resource control (RRC) message to configure a first priority level for a logical channel, from a BS. In action 104, the first UE performs a SL communication with a second UE. In action 106, the first UE generates a Medium Access Control (MAC) control element (CE) for a CSI report for the SL communication with a second priority level in a fixed value. In action 108, the first UE determines a prioritization between the MAC CE including the CSI report and data from the logical channel according to the fixed value of the second priority level and the first priority level. In action 110, the first UE transmits at least one of the MAC CE and the data from the logical channel based on the determined prioritization, to the second UE or the BS.

In one implementation, the priority level mentioned above may be pre-defined in the Third Generation Partnership Project (3GPP) specification. For example, the priority level of a CSI report is configured as a fixed value 'X' in the 3GPP specification.

Different CSI parameters included in a CSI report may have different priority levels. For example, if a Rank Indicator (RI) is included in a CSI report, the priority level of the CSI report is configured with 'X_RI'. In other examples, if a Channel Quality Indicator (CQI) is included in a CSI report, the priority level of the CSI report is configured with 'X_CQI'.

In one example, if there are one or more CSI parameters in a CSI report, the priority level of the CSI report is configured with the highest priority level among all CSI parameters. In other examples, the priority level of the CSI report is the lowest priority level among all CSI parameters.

In one implementation, the priority level may be preconfigured or configured in a Master Information Block (MIB) SL/System Information Block (SIB)/SIB-SL/RRC/SL-RRC signaling.

In one example, a priority level of a CSI report is determined according to a transmitting (TX) resource pool/receiving (RX) resource pool/bandwidth part (BWP)/carrier/UE. Different CSI parameters may be pre-defined by different priority levels. For example, if an RI is included in a CSI report, the priority level of the CSI report is configured with 'X_RI'. If a CQI is included in a CSI report, the priority level of the CSI report is configured with 'X_CQI'. If there are one or more CSI parameters in a CSI report, the priority level of the CSI report may be the highest priority level among all CSI parameters.

In one example, if there is no priority level for a CSI report in a MIB-SL/SIB/SIB-SL/RRC/SL-RRC signaling, the priority level of the CSI report is configured with a default value. The default value may be the highest priority (e.g., priority value is set to '1'). In other examples, the default value may be the lowest priority (e.g., "Max Priority"). In some examples, the default value may be predefined in the 3GPP specification.

In one example, if both broadcast signaling and dedicated signaling (e.g., RRC/SL-RRC signaling) are used for configuring a priority level for a CSI report, the priority level configured by the dedicated signaling may override the one configured by the broadcast signaling.

In one example, if a CSI report is triggered by a Sidelink Control Information (SCI) and the SCI indicates a priority level, the priority level in the SCI may override the one configured in a MIB-SL/SIB/SIB-SL/RRC/SL-RRC signaling.

In one example, priority level information is configured by an SL signaling. Three cases are disclosed.

In a first case, if a UE transmits a CSI report on a Physical Sidelink Shared Channel (PSSCH) and there are available resources (e.g., either by resource detection and selection or by indicating by a DCI SL), the UE may set the "Priority" field in the SCI of the corresponding transport block (including the CSI report) according to the "Priority-SL-CSI-report" included in a MIB-SL/SIB/SIB-SL/RRC/SL-RRC signaling.

In a second case, if a UE transmits a CSI report on a PSSCH and there are available resources (either by resource detection and selection or by indicating by a DCI SL), the UE may set the "Priority" field in the SCI of the corresponding transport block (including the CSI report) according to a default value 'X' ('X' is indicated as a priority level, and 'X' may be pre-defined and/or a fixed value in the 3GPP specification).

In a third case, a UE transmits a CSI report on a PSSCH by the first SCI that includes the "Priority" field set as '3', and the UE has received "Priority-SL-CSI-report" set as '4' in a MIB-SL/SIB/SIB-SL/RRC/SL-RRC signaling. Since the priority level in the first SCI may override the one configured in the MIB-SL/SIB/SIB-SL/RRC/SL-RRC signaling, the UE may set the "Priority" field in the second SCI of the corresponding transport block (including the CSI report) according to the first SCI triggering the CSI report.

In one implementation, a CSI report is configured with an explicit priority level. For example, a MAC CE including a CSI report (e.g., "MAC-CE_CSI") may configure a higher priority than data from any logical channel. In one example, "MAC-CE_CSI" is configured with a lower priority than data from any logical channel. In one example, "MAC-CE_CSI" is configured with a higher priority than a buffer status report (BSR) on an SL channel (e.g., "MAC-CE_BSR"). In one example, "MAC-CE_CSI" is configured with a lower priority than "MAC-CE_BSR". In one example, whether "MAC-CE_CSI" is configured with a higher priority than data from any logical channel is (pre-)configured in a MIB-SL/SIB/SIB-SL/RRC/SL-RRC signaling.

In one example, an upper layer (e.g., an RRC layer) may determine a priority value/level of "MAC-CE_CSI" according to the content (e.g., a CSI parameter) of the CSI report. For example, a priority value/level of "MAC-CE_CSI" including CQI may be configured with '4', and a priority value/level of "MAC-CE_CSI" including RI may be configured with '6'. Thus, when the UE performs a logical channel prioritization (LCP) procedure, the UE may compare the priority value of "MAC-CE_CSI" and the priority value of the logical channel (or logical channel group) associated to the data.

In one example, there may be one or more MAC CE formats for reporting different CSI parameters, and each MAC CE format corresponds to a Logical Channel ID (LCD). In this example, different MAC CE formats for CSI reports may have different priorities. For example, there may be a MAC CE for a CQI report (e.g., "MAC-CE_CQI") and a MAC-CE for an L1-RSRP report (e.g., "MAC-CE_L1-RSRP"), and "MAC-CE_CQI" may have higher priority than "MAC-CE_L1_RSRP". It is noted that in another example, MAC CE formats for reporting CSI parameters may have different payload sizes. For example, a MAC format (e.g., "MAC-CE_CSI-long") may be used to transmit one or more CSI parameters. On the other hand, a MAC format (e.g., "MAC-CE_CSI-short") may be used to report only one CSI parameter. In addition, "MAC-CE_CSI-long" may have different priority values/levels from "MAC-CE_CSI-short".

In one example, a lower layer may indicate priority information of a CSI report to a higher layer or an upper layer, and the higher layer may determine a priority for a MAC CE including the CSI report (e.g., "MAC-CE_CSI") according to the priority information from a lower layer. The priority information may be a true/false indicator. If the indicator is represented as "true", the UE may determine "MAC-CE_CSI" has higher priority than data of a logical channel. On the contrary, if the indicator is represented as "false", the UE may determine "MAC-CE_CSI" has lower priority than data.

In one example, a lower layer may indicate a priority value for a MAC CE including the CSI report (e.g., "MAC-CE_CSI"). When the UE performs an LCP procedure, the UE may compare the priority value of "MAC-CE_CSI" and the priority value of the logical channel (or logical channel group) associated with the data.

It is noted that the lower layer may indicate priority information based on the content of a SCI or content of a CSI report.

In some examples, a transmission format (TX parameter, such as TX power, Modulation and Coding Scheme (MCS), the number of retransmissions, sub-channel number, retransmission number, or Channel Occupancy Ratio (CR) limit) of a MAC protocol data unit (PDU) is determined based on "MAC-CE_CSI priority" that depends on its priority if the MAC PDU only includes "MAC-CE_CSI".

In some examples, if there is a pending "MAC-CE_CSI" and a pending "MAC-CE_CSI" associates with a ProSe Destination (e.g., an L1 Destination ID or an L2 Destination ID), the UE may select the ProSe Destination of the pending "MAC-CE_CSI" first when the UE performs an LCP procedure rather than the priority information. It is noted that if there are one or more pending MAC-CE_CSI(s), the UE may select one ProSe Destination ID among them according to the priority level of "MAC-CE_CSI".

It is noted that the term "ending" may indicate that when a "MAC-CE_CSI" is received by a concerned UE, the concerned UE may determine the CSI report is pending until the higher layer of the UE allocates an SL resource for the CSI report.

Figure 2:
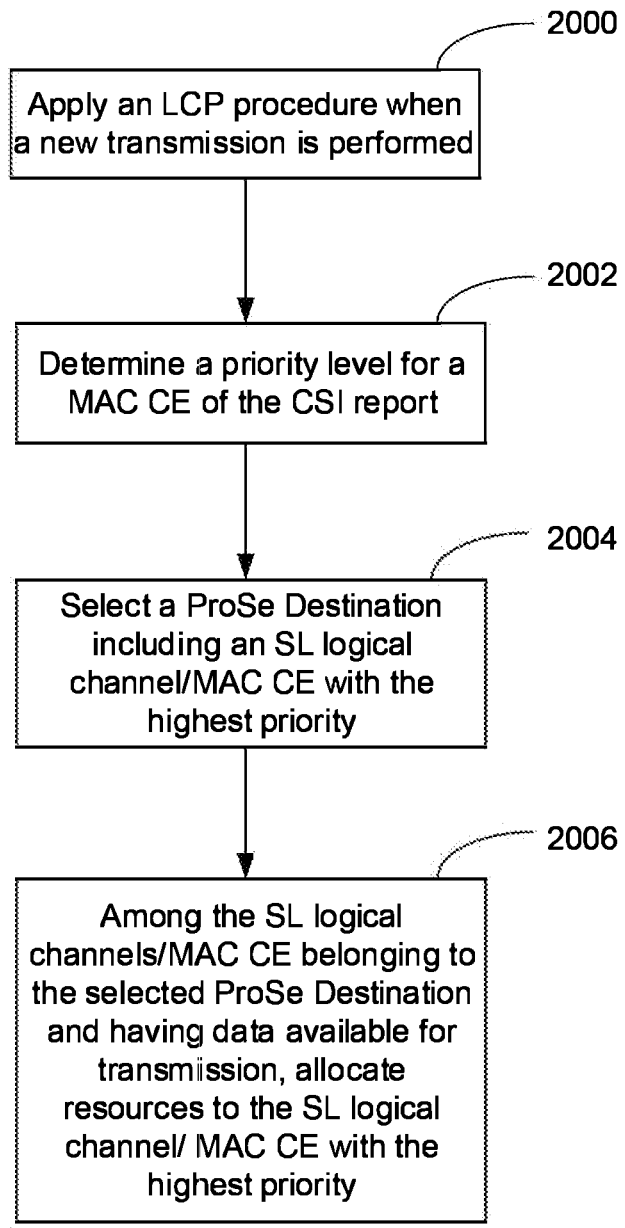
FIG. 2 is a flowchart illustrating a priority level of a CSI report in a logical channel prioritization (LCP) procedure with explicit priority value, in accordance with example implementations of the present disclosure.

With reference to FIG. 2, a priority level of a CSI report in an LCP procedure with an explicit priority value is illustrated.

In action 2000, the LCP procedure is applied when a new transmission (e.g., data/transport block (TB) or a CSI report) is performed on an SL grant, or for each SCI (or an SL grant) corresponding to a new transmission in V2X SL communication.

In action 2002, a priority level for a MAC CE of the CSI report is determined. Each SL logical channel has an associated priority level which is (pre-)configured in a MIB-SL/SIB/SIB-SL/RRC/SL-RRC signaling. Multiple SL logical channels may have the same associated priority level. Different MAC CE formats may correspond to different priority levels. For example, there may be a MAC CE for a CQI report (e.g., "MAC-CE_CQI") and a MAC CE for an L1-RSRP report (e.g., "MAC-CE_L1-RSRP"), and "MAC-CE_CQI" may have a higher priority than "MAC-CE_L1_RSRP". Besides, a MAC CE for an SL BSR may have a lower/higher priority level than the MAC-CE for the CSI report.

In one example, a lower layer may indicate a priority level of a MAC CE for a CSI report when the lower layer sends a CSI report to a higher layer (e.g., the MAC layer).

In one example, there may be two MAC CE formats: a short MAC CE format for only containing one CSI parameter (e.g., for either RI or CQI), and a long MAC CE format for containing more than one CSI parameter (e.g., for both RI and CQI). Short and long MAC CE formats may have different priority levels.

In action 2004, a ProSe Destination including the SL logical channel or a MAC CE format with the highest priority may be selected by a higher layer (e.g., the MAC layer) from among the SL logical channels or the MAC CE having data available for transmission.

In action 2006, among the SL logical channels/MAC CE belonging to the selected ProSe Destination and having data available for transmission, the higher layer (e.g., the MAC layer) may allocate resources to the SL logical channel/MAC CE with the highest priority for each MAC PDU associated to the SCI.

Figure 3:
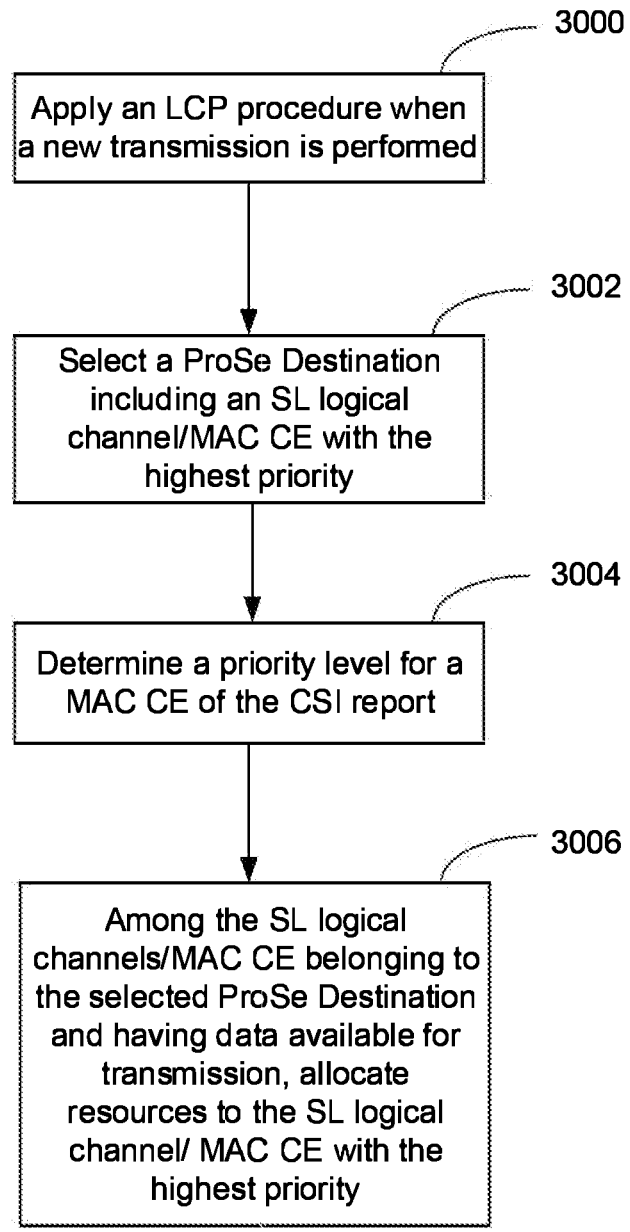
FIG. 3 is a flowchart illustrating a priority level of a CSI report in an LCP procedure with explicit priority value by selecting a ProSe Destination, in accordance with example implementations of the present disclosure.

With reference to FIG. 3, a priority level of a CSI report in an LCP procedure with an explicit priority value by selecting a ProSe Destination is illustrated.

In action 3000, the LCP procedure is applied when a new transmission is performed on an SL grant, or for each SCI (or an SL grant) corresponding to a new transmission in V2X SL communication. In action 3002, a ProSe Destination including the SL logical channel/MAC CE with the highest priority may be selected by a higher layer (e.g., the MAC layer) from among the SL logical channels having data available for transmission. In action 3004, a priority level for a MAC CE of the CSI report is determined. Each SL logical channel has an associated priority level that is (pre-)configured in an MIB-SL/SIB/SIB-SL/RRC/SL-RRC signaling. Multiple SL logical channels may have the same associated priority level. Different MAC CE formats may correspond to different priority levels. For example, there may be a MAC CE for a CQI report (e.g., "MAC-CE_CQI") and a MAC CE for an L1-RSRP report (e.g., "MAC-CE_L1-RSRP"), and "MAC-CE_CQI" may have higher priority than "MAC-CE_L1_RSRP". Besides, a MAC CE for an SL BSR may have a lower/higher priority level than the MAC CE for the CSI report.

In one example, a lower layer may indicate a priority level of a MAC CE for a CSI report when a lower layer sends the CSI report to a higher layer (e.g., the MAC layer).

In one example, there may be two MAC CE formats: a short MAC-CE format for only one CSI parameter (e.g., for either RI or CQI), and a long MAC CE format for more than one CSI parameter (e.g., for both RI and CQI). Short and long MAC CE formats may have different priority levels.

In action 3006, among the SL logical channels/MAC-CE belonging to the selected ProSe Destination and having data available for transmission, the higher layer (e.g., the MAC layer) may allocate resources to the SL logical channel/MAC CE with the highest priority for each MAC PDU associated to the SCI.

In one implementation, a CSI report is configured without explicit priority information.

In one example, if there is a pending "MAC-CE_CSI" and a pending "MAC-CE_CSI" associates to a ProSe Destination (e.g., L1 Destination ID or L2 Destination ID), the UE may select the ProSe Destination rather than the priority information first when the UE performs an LCP procedure. In one example, a lower layer may indicate information about the source ID (e.g., L1 source ID or L2 source ID) that triggers a CSI report to a higher layer for determining the ProSe Destination of the "MAC-CE_CSI".

In one example, the CSI report is triggered by a MAC CE (e.g., "MAC-CE_CSI trigger"), and the ProSe Destination of the "MAC-CE_CSI" is included in the MAC PDU that includes "MAC-CE_CSI trigger".

In one example, there may be a counter for a pending "MAC-CE_CSI", and the counter may decrease when the UE generates a MAC PDU without serving the pending "MAC-CE_CSI" (or finish the LCP procedure without allocating resources for the pending "MAC-CE_CSI"). If the counter equals to a specific value (e.g., '0'), a higher layer may determine the pending "MAC-CE_CSI" has the highest priority during the LCP procedure (or for the next LCP procedure).

In one example, the counter is reset when the corresponding "MAC-CE_CSI" is included in a MAC PDU.

In one example, the priority level of "MAC-CE_CSI" may increase as the counter decreases. For example, as the counter decreases every 'Y', the priority level of "MAC-CE_CSI" increases by one priority level until "MAC-CE_CSI" reaches the highest priority level. Every time "MAC-CE_CSI" increases by one priority level, the counter is reset until "MAC-CE_CSI" reaches the highest priority level. Besides, when "MAC-CE_CSI" increases by one priority level, the timer is reset.

It is noted that this timer may be maintained per ProSe Destination, and the timer may be reset when a higher layer allocates a resource for "MAC-CE_CSI" of the ProSe Destination or when a new "MAC-CE_CSI" of the ProSe Destination is pending.

It is noted that the length of the timer may be (pre-)configured per BWP/(TX/RX) resource pool/carrier/UE.

"MAC-CE_CSI" may be determined during an LCP procedure according to a channel quality (e.g., Channel busy ratio (CBR), Channel occupancy ratio (CR), Receive Strength Signal Indicator (RSSI), Reference Signal Receiving Power (RSRP)) or according to a distance (e.g., from a source UE to a destination UE, which associates to the ProSe Destination). For example, a higher layer may check the CBR of the BWP/(TX/RX) resource pool/carrier when performing the LCP procedure, and if the CBR is higher than a threshold, the higher layer may not allocate resources for "MAC-CE_CSI" (or "MAC-CE_CSI" may have a lower priority than any data).

Regarding the distance, the higher layer may check the distance when performing the LCP procedure, and if the distance is larger than a threshold, the higher layer may not allocate resources for "MAC-CE_CSI" (or "MAC-CE_CSI" may have a lower priority than any data).

It is noted that channel quality (e.g., CBR, CR, RSSI, RSRP) or the distance (e.g., either GPS information or L1-RSRP) from the source UE to the destination UE may be indicated by the lower layer or an RRC layer.

Figure 4:
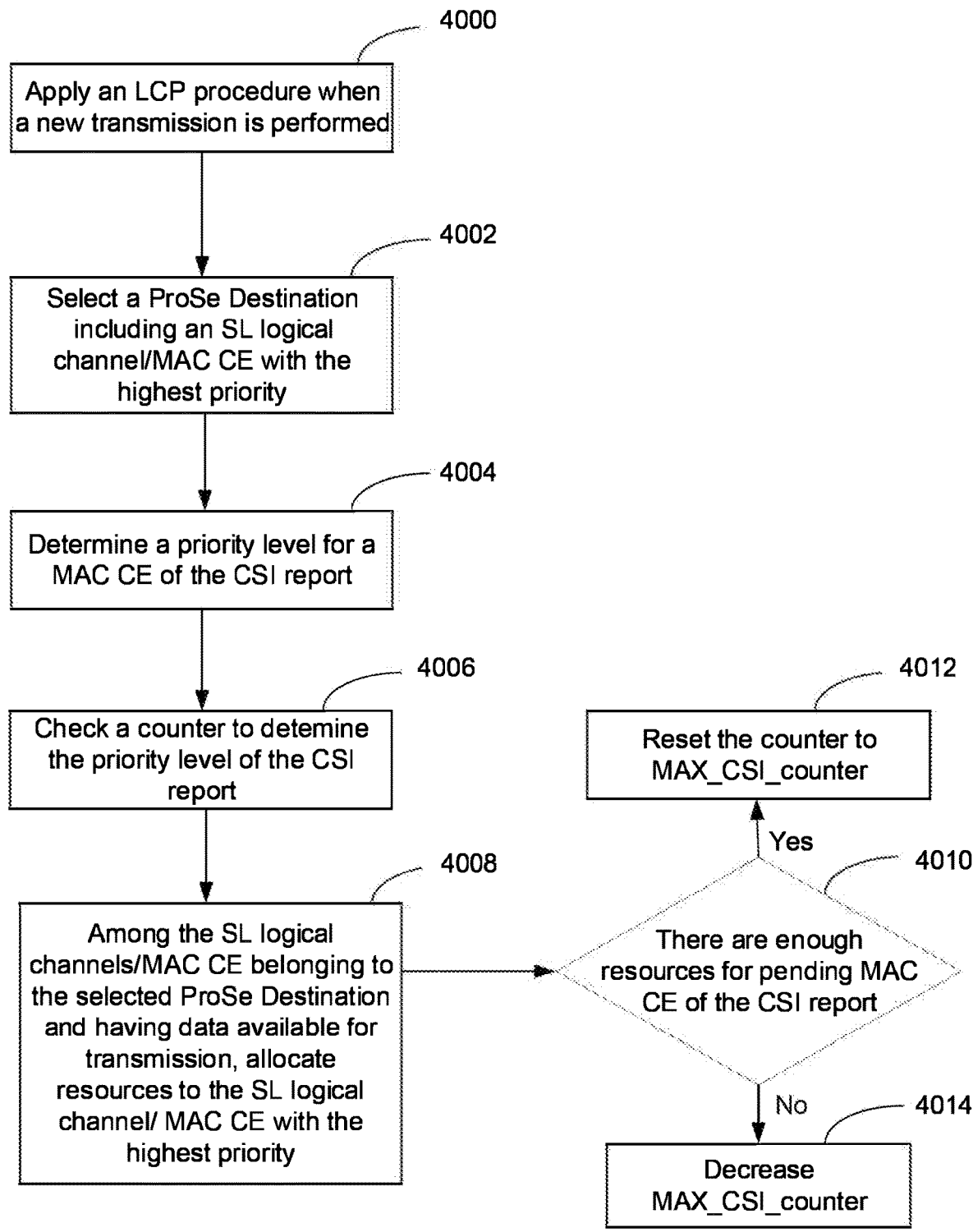
FIG. 4 is a flowchart illustrating a counter for a pending MAC CE for a CSI report, in accordance with example implementations of the present disclosure.

With reference to FIG. 4, a counter for a pending MAC CE for a CSI report (e.g., "MAC-CE_CSI") is illustrated.

In action 4000, an LCP procedure is applied when a new transmission is performed on an SL grant, or for each SCI (or an SL grant) corresponding to a new transmission in V2X SL communication. In action 4002, a ProSe Destination including an SL logical channel/MAC CE with the highest priority may be selected by a higher layer (e.g., the MAC layer) from among the SL logical channels having data available for transmission. In action 4004, a priority level for a MAC CE of the CSI report is determined. Each SL logical channel is indicated/configured with an associated priority level that is (pre-)configured in an MIB-SL/SIB/SIB-SL/RRC/SL-RRC signaling. Multiple SL logical channels may be indicated/configured with the same associated priority level. Different MAC CE formats may correspond to different priority levels. For example, there may be a MAC CE for a CQI report (e.g., "MAC-CE_CQI") and a MAC-CE for an L1-RSRP report (e.g., "MAC-CE_L1-RSRP"), and "MAC-CE_CQI" may have higher priority than "MAC-CE_L1_RSRP". Besides, a MAC CE for an SL BSR may have a lower/higher priority level than a MAC CE for a CSI report.

In one example, a lower layer may indicate a priority level of MAC CE for a CSI report when a lower layer sends a CSI report to a higher layer (e.g., a MAC layer).

In one example, there may be two MAC CE formats: a short MAC CE format for only one CSI parameter (e.g., for either RI or CQI), and a long MAC CE format for more than one CSI parameter (e.g., for both RI and CQI). Short and long MAC CE formats may have different priority levels.

In action 4006, if a counter is set to '0', a higher layer may determine a pending "MAC-CE_CSI" with a higher priority level. In one example, the priority level may be higher as the counter decreases.

In action 4008, among the SL logical channels/MAC CE belonging to the selected ProSe Destination and having data available for transmission, a higher layer (e.g., the MAC layer) may allocate resources to the SL logical channel/MAC CE with the highest priority for each MAC PDU associated to the SCI.

In action 4010, if there are enough resources for "MAC-CE_CSI", a higher layer may allocate a resource to "MAC-CE_CSI" and reset the counter to "MAX CSI counter" (as illustrated in action 4012). If there is still a pending "MAC-CE_CSI" after a higher layer (the MAC layer, or a MAC entity of the LTE/NR PC5 interface) allocates resources of the grant and there are no remaining resources, the counter may decrease (as illustrated in action 4014).

In some implementations, a priority level of a MAC PDU that includes "MAC-CE_CSI" may be changed according to the number of re-transmissions of the MAC PDU. For example, for every Z times of (re-)transmission, the priority level of "MAC-CE_CSI" increases by one priority level until "MAC-CE_CSI" reaches the highest priority level.

It is noted that the MAC PDU may be associated with an SL Hybrid Automatic Repeat Request (HARQ) process, and the re-transmission may be triggered by the associated SL HARQ process.

If a timer of a CSI report expires (e.g., the timer may be maintained by a higher layer or a lower layer) or the CSI report is expired/invalid/stopped, the higher layer may flush the HARQ buffer of the identified HARQ process to which the PDU of "MAC-CE_CSI" pertains. It is noted that when the timer expires, the lower layer may send an indication to the higher layer to solve the outdated CSI report (for example, to cancel the pending CSI report and ignore the stored information).

If a timer for a CSI report expires (e.g., the timer may be maintained by a higher layer or a lower layer) or the CSI report is expired/invalid, the higher layer of the first UE (TX UE) may determine that the CSI report from the second UE (RX UE) fails. Then, the first UE may trigger another CSI report. In one example, the first UE may trigger a radio link failure (RLF) or an SL physical layer problem (e.g., in one specific SL frequency carrier). In one example, the first UE may attempt to trigger the CSI report in another resource pool/in another BWP/in another carrier.

It is noted that the triggered CSI report may be terminated if an SL RLF problem happens (e.g., between the TX UE/RX UE) or a physical layer problem happens on a concerned SL frequency carrier.

Figure 5:
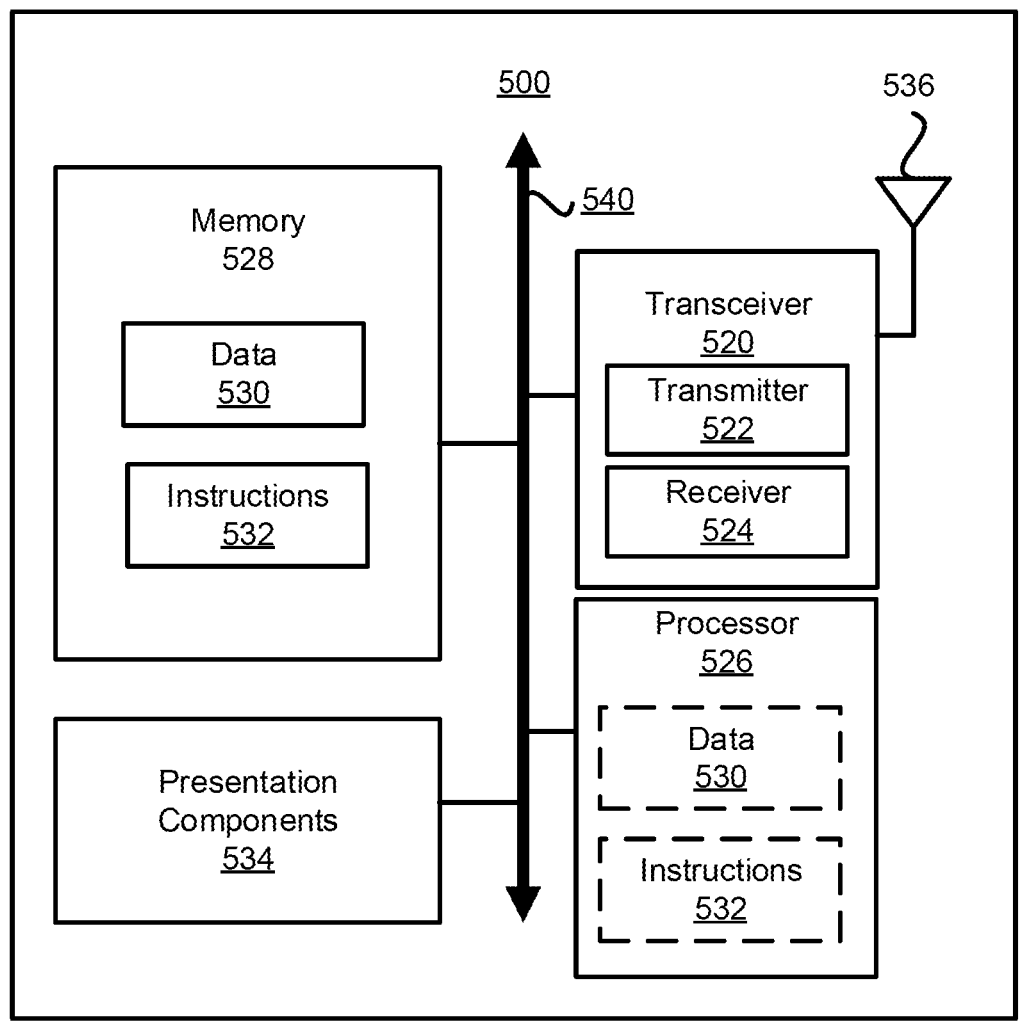
FIG. 5 is a block diagram illustrating a node for wireless communication, in accordance with example implementations of the present disclosure.

FIG. 5 illustrates a node 500 for wireless communication according to the present disclosure.

As illustrated in FIG. 5, the node 500 may include a transceiver 520, a processor 526, memory 528, one or more presentation components 534, and at least one antenna 536. The node 500 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 540. The node 500 may be a UE that performs various disclosed functions as illustrated in FIG. 1.

The transceiver 520 includes a transmitter 522 (with transmitting circuitry) and a receiver 524 (with receiving circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any media that can be accessed by the node 500 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 528 may include computer-storage media in the form of volatile and/or non-volatile memory. The memory 528 may be removable, non-removable, or a combination thereof. Memory includes solid-state memory, hard drives, and optical-disc drives. As illustrated in FIG. 5, the memory 528 may store computer-readable, computer-executable instructions 532 (e.g., software codes) that are configured to cause the processor 526 (e.g., processing circuitry) to perform various disclosed functions. Alternatively, the instructions 532 may be configured to cause the node 500 (e.g., when compiled and executed) to perform various disclosed functions.

The processor 526 may include an intelligent hardware device (e.g., a central processing unit (CPU), a microcontroller, an Application-Specific Integrated Circuit (ASIC), etc.). The processor 526 may include memory. The processor 526 may process the data 530 and the instructions 532 received from the memory 528, and information received via the transceiver 520, the baseband communications module, and/or the network communications module. The processor 526 may also process information to be sent to the transceiver 520 for transmission via the antenna 536, to the network communications module for transmission to a CN.

One or more presentation components 534 present data to a person or other device. Presentation components 534 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for channel state information (CSI) reporting performed by a first user equipment (UE), the method comprising:

receiving, from a base station (BS), a radio resource control (RRC) message to configure a first priority level for a logical channel, wherein the first priority level for the logical channel is associated with a resource pool;

performing a sidelink (SL) communication with a second UE;

generating a Medium Access Control (MAC) control element (CE) to include a CSI report for the SL communication with a second priority level that is a fixed value;

determining a prioritization between the MAC CE including the CSI report and data from the logical channel according to the fixed value of the second priority level and the first priority level associated with the resource pool; and transmitting, to the second UE or the BS, at least one of the MAC CE and the data from the logical channel based on the determined prioritization.

2. The method of claim 1, wherein the fixed value of the second priority level of the CSI report is set to different values according to CSI parameters included in the CSI report.

3. The method of claim 2, wherein the CSI parameters include a rank indicator (RI) and a channel quality indicator (CQI).

4. The method of claim 1, wherein the fixed value of the second priority level of the CSI report is set to different values according to a quantity of CSI parameters included in the CSI report.

5. The method of claim 1, wherein the fixed value of the second priority level of the CSI report is set to different values according to a MAC CE format for the CSI report.

6. The method of claim 1, wherein the data from the logical channel includes SL data and uplink (UL) data.

7. The method of claim 1, wherein the fixed value of the second priority level is set to a default value indicating a highest priority level or a lowest priority level.

8. The method of claim 1, wherein the prioritization is determined based on a highest priority level or a lowest priority level.

9. The method of claim 1, wherein the first priority level is associated with a channel busy ratio (CBR) of the resource pool.

10. A first user equipment (UE) for reporting channel state information (CSI), the first UE comprising:

at least one processor; and at least one non-transitory computer-readable medium storing one or more instructions that, when executed by the at least one processor, cause the UE to:

receive, from a base station (BS), a radio resource control (RRC) message to configure a first priority level for a logical channel, wherein the first priority level for the logical channel is associated with a resource pool;

perform a sidelink (SL) communication with a second UE;

generate a Medium Access Control (MAC) control element (CE) to include a CSI report for the SL communication with a second priority level that is a fixed value;

determine a prioritization between the MAC CE including the CSI report and data from the logical channel according to the fixed value of the second priority level and the first priority level associated with the resource pool; and transmit, to the second UE or the BS, at least one of the MAC CE and the data from the logical channel based on the determined prioritization.

11. The first UE of claim 10, wherein the fixed value of the second priority level of the CSI report is set to different values according to CSI parameters included in the CSI report.

12. The first UE of claim 11, wherein the CSI parameters include a rank indicator (RI) and a channel quality indicator (CQI).

13. The first UE of claim 10, wherein the fixed value of the second priority level of the CSI report is set to different values according to a quantity of CSI parameters included in the CSI report.

14. The first UE of claim 10, wherein the fixed value of the second priority level of the CSI report is set to different values according to a MAC CE format for the CSI report.

15. The first UE of claim 10, wherein the data from the logical channel includes SL data and uplink (UL) data.

16. The first UE of claim 10, wherein the fixed value is set to a default value indicating a highest priority level or a lowest priority level.

17. The first UE of claim 10, wherein the prioritization is determined based on a highest priority level or a lowest priority level.

18. The first UE of claim 10, wherein the first priority level is associated with a channel busy ratio (CBR) of the resource pool.

* * * * *